United States Patent
VanOtteren et al.

(10) Patent No.: US 6,281,466 B1
(45) Date of Patent: Aug. 28, 2001

(54) PROJECTION WELDING OF AN ALUMINUM SHEET

(75) Inventors: Robert G. VanOtteren, Bay City, MI (US); Edward P. Patrick, Murrysville; Donald J. Spinella, Greensburg, both of PA (US)

(73) Assignees: Newcor, Inc., Bloomfield Hills, MI (US); Aluminum Company of America, Pittsburgh, PA (US)

( * ) Notice: Subject to any disclaimer, the term of this patent is extended or adjusted under 35 U.S.C. 154(b) by 0 days.

(21) Appl. No.: 09/340,845

(22) Filed: Jun. 28, 1999

(51) Int. Cl.[7] .................. B23K 11/14; B23K 11/20; B23K 11/16
(52) U.S. Cl. ............................ 219/118; 219/93
(58) Field of Search .................... 219/118, 93

(56) References Cited

U.S. PATENT DOCUMENTS

| | | |
|---|---|---|
| 4,273,983 * | 6/1981 | Ogawa et al. . |
| 4,495,397 | 1/1985 | Opprecht et al . |
| 4,591,687 | 5/1986 | Urech . |
| 4,850,214 * | 7/1989 | Opprecht et al. . |
| 5,473,133 * | 12/1995 | Peterson . |
| 5,633,093 * | 5/1997 | Rhoda et al. . |
| 5,714,730 | 2/1998 | Geiermann et al. . |
| 5,783,794 | 7/1998 | Oikawa et al. . |
| 6,037,558 | 3/2000 | Geiermann et al. . |
| 6,044,552 * | 4/2000 | Mori et al. . |
| 6,054,668 | 4/2000 | Van Otteren et al. . |

FOREIGN PATENT DOCUMENTS

| | | |
|---|---|---|
| 645563-As * | 10/1984 | (CH) . |
| 649485-As * | 5/1985 | (CH) . |
| 652955-As * | 12/1985 | (CH) . |
| 31 13754 A1 | 7/1982 | (DE) . |
| 36 05115 A1 | 8/1987 | (DE) . |
| 06170549 * | 6/1994 | (JP) . |
| 11050817 * | 2/1999 | (JP) . |

OTHER PUBLICATIONS

Resistance Welding Manual, Fourth Edition, 1989 4 pages.
Materials Joining Tech Briefs, Brief #4, Nov. 1994 2 pages.

* cited by examiner

*Primary Examiner*—Tom Dunn
*Assistant Examiner*—Colleen Cooke
(74) *Attorney, Agent, or Firm*—Flynn, Thiel, Boutell & Tanis, P.C.

(57) ABSTRACT

A projection coined onto a metal sheet, preferably an aluminum sheet, for projection welding the sheet to an adjacent metal sheet. The projection has a thickness greater than the thickness of the sheet on which it is formed. The wall of the projection surrounds a first recess and a second recess is formed in a side of the sheet opposite the projection from which the metal cold flows to form the projection. A welding gun assembly having an improved low interia, fast response to the collapse of the projection welding the sheet having the projection to the adjacent sheet.

8 Claims, 8 Drawing Sheets

US 6,281,466 B1

PROJECTION WELDING OF AN ALUMINUM SHEET

FIELD OF THE INVENTION

This invention relates to projection welding of metal sheet to another metal body and, more specifically, to an improved projection and projection forming process for thin aluminum sheet for projection welding thereof, and an improved welding gun for use therewith.

BACKGROUND OF THE INVENTION

Projection welding is a known technique for joining two overlapping metal sheets. In conventional projection welding, a small projection is provided on one of the sheets and extends transversely to a side of the sheet so that the tip thereof contacts the other sheet. An electrode of a welding gun is pressed into contact with one of the sheets in alignment with the projection, and a combination of force and welding current is applied to the electrode to cause the projection to collapse and form a weld nugget which joins the two sheets together at the contact area defined by the projection.

FIG. 1 illustrates a known arrangement 10 for projection hem welding. This welding arrangement 10 is particularly desirable for projection welding of thin sheet-like metal components disposed in overlapping relation, typically light-gauge steel sheets which commonly have a thickness in the range of about 0.020 to about 0.050 inch. The thin sheets 11 and 12 have portions which directly overlap, and in a hem welding process one of the sheets 11 has a flange or hem part 13 which is bent to overlap another side of the other sheet 12. The sheet 12 is sandwiched between the sheet 11 and its hem part 13. Intermediate sheet 12 has a bead or projection 14 projecting transversely therefrom so that the tip of the projection contacts the adjacent surface of the hem part 13. A projection weld is created Directly between the sheet 12 and the hem part 13 at the region of the projection 14.

An adhesive 16 can be placed between the two sheets 11, 12 (FIGS. 2 and 3). The adhesive 16 is a heat curable adhesive that will further secure the two metal sheets together after it is activated by applying heat thereto, usually in an oven.

In the projection welding arrangement 10 as shown in FIG. 1, the overlapping sheets 11, 12 are typically positioned on a support or die 15, and a movable welding head assembly 17 is positioned adjacent the die 15 to effect the projection weld between the overlapped sheets. The welding head assembly 17 includes a hollow housing 18 having an electrode 19 movably supported therein and projecting outwardly for contact with the overlapped sheets in the region of the projection, and a spring 21 is confined within the housing 18 and acts against an inner face of the electrode 19 so as to urge the electrode outwardly into an extended position, in which position the electrode abuts an interior stop surface formed on the housing. The welding head assembly 17 is electrically connected to a stationary transformer 22. The power supply to the transformer 22, and hence the welding current supplied to the welding head assembly, is controlled by a suitable control unit 23. The transformer 22 has the primary coils 24 thereof connected to suitable electrical conductors 25 and 26 that supply electrical energy to the transformer 22. The secondary coils 27 of the transformer are in turn connected to electrical conductors 28 and 29, one of which is connected to the welding head assembly 17 and the other is connected to the workpieces 11, 12, such as being connected either to the die 15 or to an electrical contact gun 31. The contact gun 31 includes a support 32 such as a conventional double-acting pressure cylinder, normally an air cylinder, having a conventional electrode 33 movably supported thereon. The electrode 33 engages a part 34 of the intermediate sheet 12, which part 34 is shown as spaced from the overlapping portions of the sheets. The conductors 28 and 29 are typically constructed of a conventional flexible lamination so as to permit respective movement of the welding head assembly 17 and contact assembly 31 relative to transformer 22.

The welding head arrangement also includes a drive device 36 for effecting movement of the welding head assembly 17. The drive device conventionally comprises a pneumatic cylinder 37 having a housing 38, which is typically stationarily mounted spaced and separate from the welding head assembly 17. An extendible and contractible piston rod 39 extends from the housing 38 and couples the housing 18 of the welding head assembly 17 to the drive device 36. The piston rod 39 controls the movement of the assembly 17 into engagement with the sheets 11, 12 when a projection welding operation is carried out.

When projection welding as summarized above, the projection is typically stamped or embossed on the thin steel sheet by opposed dies which deform the sheet by forcing a portion thereof sidewardly so as to define a projection which projects sidewardly of the sheet generally in the direction of the force applied by the forming die. The projection typically comprises a geometric shape such as a truncated conical or partial spherical shape as it projects transversely from the sheet. This method of forming the projection and the resulting shape thereof necessarily results in the wall thickness of the projection being thinner than the thickness of the base sheet, and also typically results in the base wall of the projection (i.e. the portion of the wall where the projection joins to the base sheet) being disposed in a sloped or angled relationship relative to the plane of the sheet. These latter configurational features, however, have not detrimentally effected the ability of the projection to create proper quality welds between thin steel sheets since steel possess a high tensile strength and thus is able to withstand the significant compressive force applied thereto prior to reaching the actual melting or welding temperature. Premature collapse of the projection during projection welding of sheet steel has thus not presented a significant problem.

When projection welding an aluminum sheet, however, totally different melting temperature and tensile strength properties are exhibited by aluminum sheet in comparison to steel sheet, and accordingly repeatably and successfully effecting projection welding of aluminum sheets can not normally be achieved. More specifically, not only does aluminum possess a significantly lower strength than steel, but more significantly it has been observed that the yield strength of aluminum undergoes a significant decrease when aluminum is heated to a temperature between two and four hundred degrees F. (FIG. 4), and in fact this significant decrease in strength occurs over a very small temperature range which is still significantly below the melting or welding temperature for aluminum. The many prior attempts to projection weld thin aluminum sheets have hence mostly met with failure since the projections have exhibited premature collapse thereof at a temperature which is significantly below welding temperature. Thus, it has not been repeatably possible to properly maintain the requisite electrode pressure on the projection, nor has it been repeatably possible for the electrode to properly follow up the collapsing of the projection so as to maintain proper current-transmitting contact therewith. The proper contact and hence transfer of current to the projection, and the proper concentration of the current through the small electric contact area defined by the projection, have thus not been dependably and repeatably achievable, and accordingly proper weld nuggets have not typically been achievable when attempting to projection weld aluminum sheets.

Accordingly, it is an object of this invention to provide improvements for projection welding of thin metal sheets and particularly improvements applicable for permitting successful projection welding in situations where the thin metal sheet having the projection formed thereon is constructed of aluminum.

More specifically, it is an object of the invention to provide an improved projection which is monolithically associated with a thin aluminum sheet for permitting successful performance of a projection welding operation, which projection due to its improved shape, size and forming process provides significantly increased strength so as to withstand the electrode pressure imposed thereon without experiencing premature collapse, thereby maintaining both proper interface pressure, contact area, and current density between the projection and the adjacent metal body until reaching the temperature at which the projection rapidly collapses and permits creation of a metallurgical bond between the overlapped metal sheets and body.

In the present invention, the projection is formed generally as a hollow upright cylindrical wall which is cantilevered perpendicularly away from one side of the aluminum sheet. The hollow upright wall has a wall thickness which approaches or is substantially equal to the thickness of the sheet, and also has significant height so as to define a column having significant strength against compression. The column where it joins the sheet is also backed by a full thickness of the sheet. The interior of the column opens downwardly from the free end thereof so as to terminate at a bottom wall which, in a preferred embodiment, is substantially flush with the upper surface of the sheet but is of significantly reduced thickness in comparison to the sheet thickness. A forming recess opens inwardly from the opposite side of the sheet in coaxial alignment with the projection and terminates at the thin bottom wall. The forming recess typically is limited by an outer side wall which does not extend radially beyond the radial extent of the inner wall of the hollow upright cylindrical wall.

The projection of this invention is preferably formed by a coining operation whereby the sheet material is squeezed sidewardly during forming of the bottom recess and is then forced to flow outwardly (i.e. perpendicularly) so as to permit creation of the hollow upright cylindrical wall. The material forming the upright thus undergoes significant cold working which not only effects creation of the thick upright wall so as to provide significant column strength, but also effects significant cold working of the material so as to further increase the strength thereof.

The present invention also includes an improved welding gun which, in conjunction with the improved projection, permits performance of successful projection welding of thin metal sheets, particularly aluminum sheets. The welding gun employs a spring-urged electrode which possesses minimal mass and inertia so as to readily respond to the collapse of the upright projection during the welding operation, thereby maintaining proper contact pressure and concentration of the welding current to thus result in a desired weld nugget or joint.

Other objects and purposes of the invention will be apparent to persons familiar with technology of this general type upon reading the following specification and inspecting the accompanying drawings.

Figure 1:
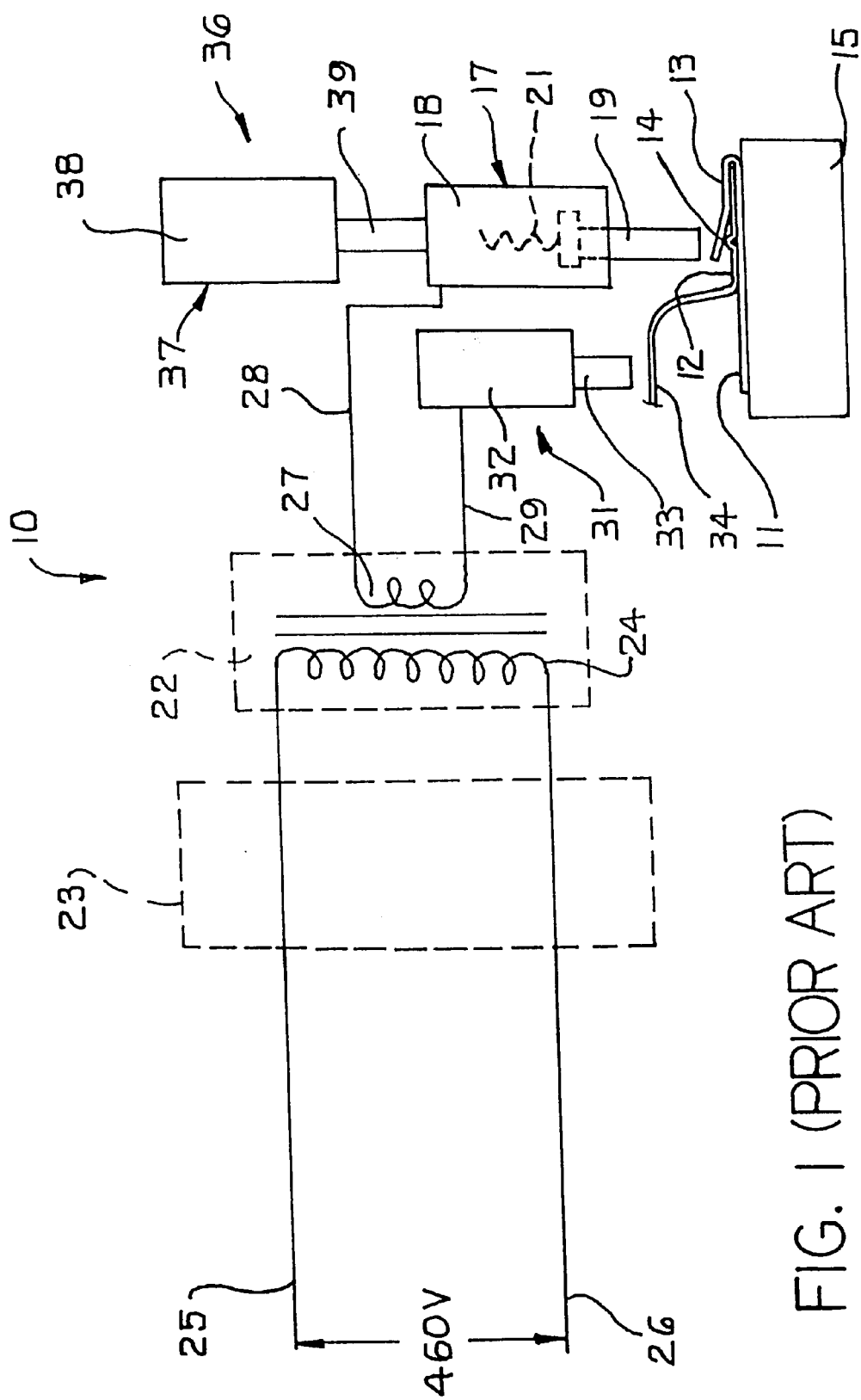
FIG. 1 is a schematic view of a conventional projection welding system.
Figure 2:
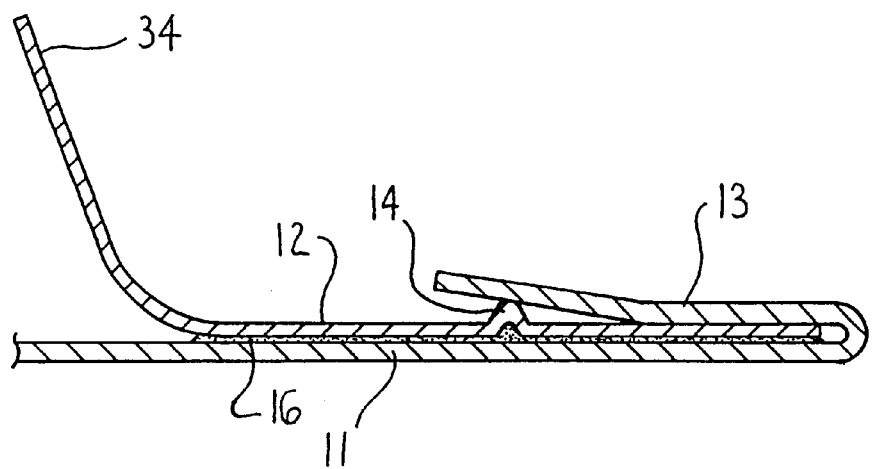
FIG. 2 is an enlarged view of conventional thin metal sheets for projection welding.
Figure 3:
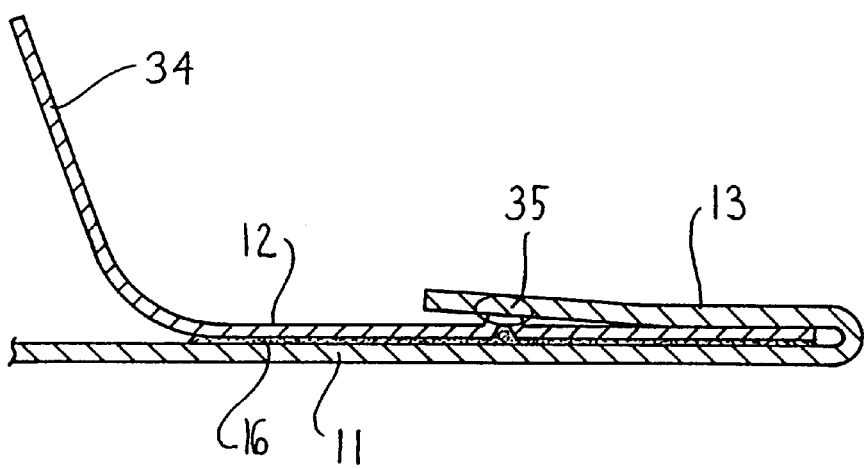
FIG. 3 is an view similar to FIG. 2 showing the collapsed projection and creation of a weld nugget.
Figure 4:
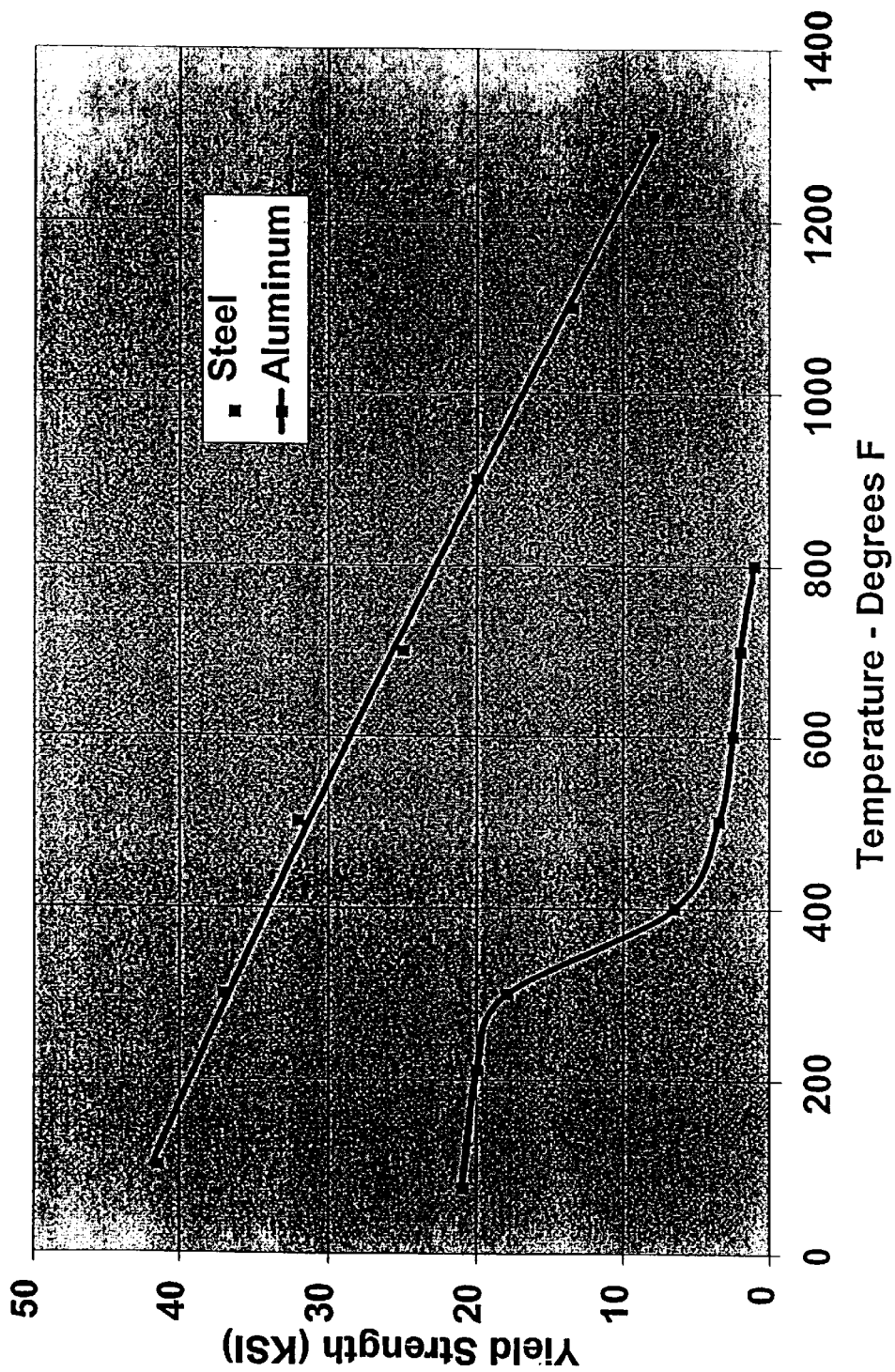
FIG. 4 is a graph of yield strength versus temperature for steel and aluminum.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will also refer to directions toward and away from, respectively, the geometric center of the arrangement being described and designated parts thereof. Such terminology will include the words specifically mentioned, derivatives thereof, and words of similar meaning.

DETAILED DESCRIPTION

The following description of a preferred embodiment of the present invention will first describe the structure of the projection, then describe the dies and method for creating the projection, and thereafter describe the welding gun used to create a projection weld between a metal sheet and adjacent metal body, at least one of which is preferably of aluminum.

Figure 5:
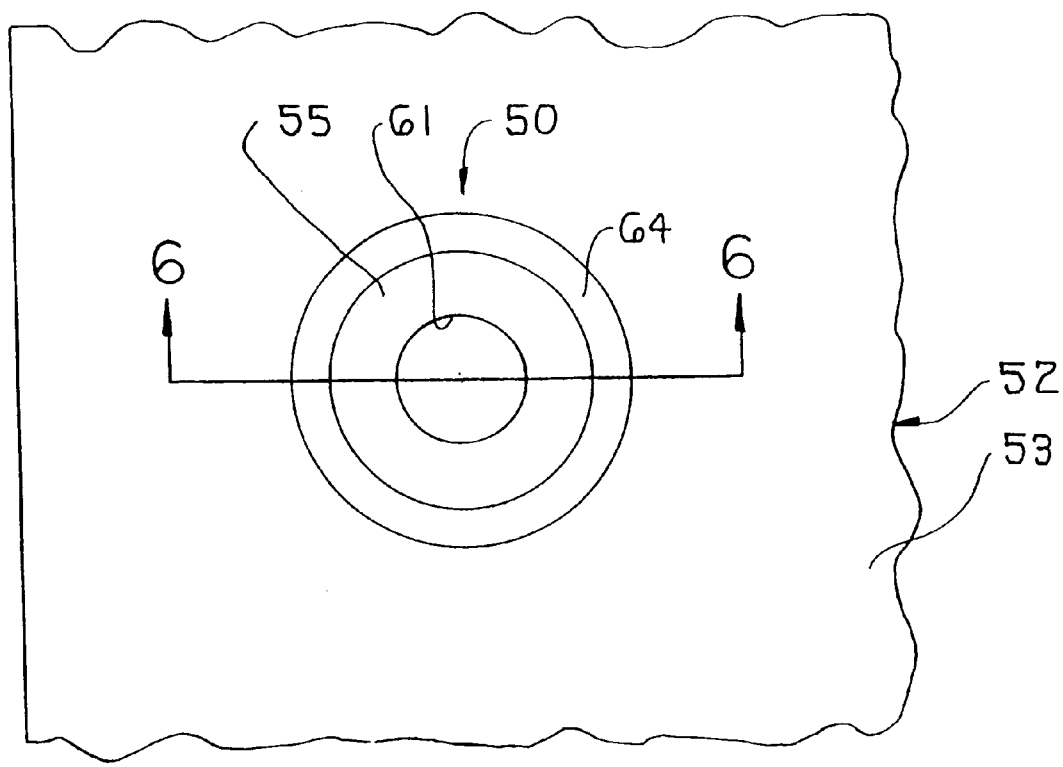
FIG. 5 is a plan view of the projection of the present invention.
Figure 6:
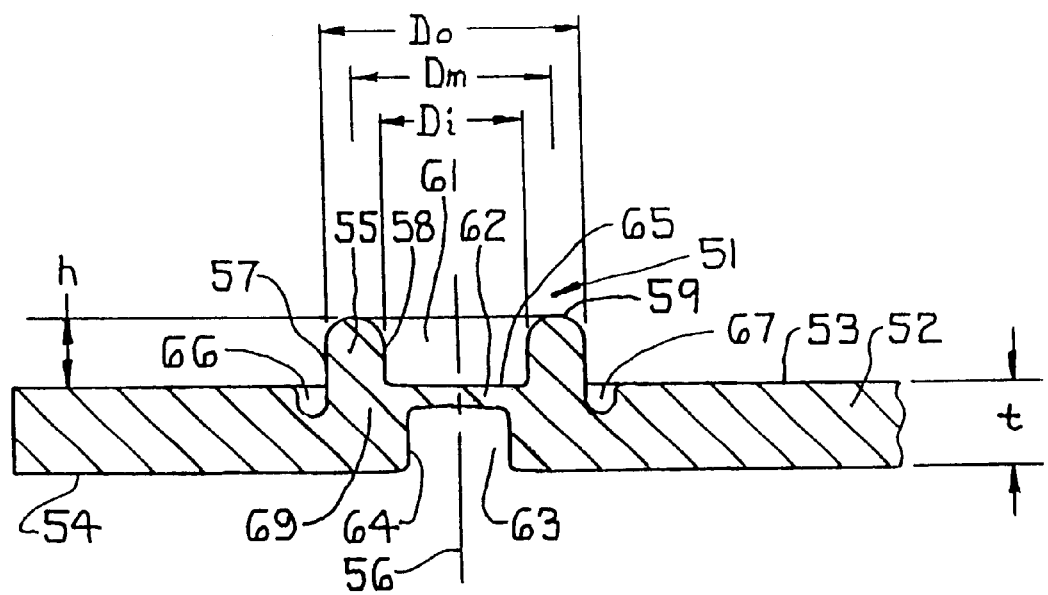
FIG. 6 is a cross sectional view taken along line 6—6 in FIG. 5.

Referring to FIGS. 5 and 6, there is illustrated an improved projection 51 according to the present invention, particularly for projection welding of relatively thin metal sheets. The projection 51 is integrally and monolithically formed as a part of a substantially large but thin metal, and preferably aluminum or aluminum alloy, sheet 52 which has substantially planar and parallel first and second side surfaces 53 and 54, the latter herein being referred to as upper and lower surfaces for convenience in reference. The term "sheet" refers to an metal material, preferably aluminum or aluminum alloy, having a thickness of about 0.006 to 0.249 inch.

The projection 51 is defined primarily by an endless, here shown as a cylindrical, upright wall 55 which is preferably tubular in cross section and is formed about an axis 56 which extends substantially perpendicularly with respect to the plane of the sheet 52. The upright wall 55 is thus cantilevered upwardly from the sheet 52 in substantially perpendicular relationship therewith and forms a cylinder.

The cylindrical wall 55 is defined by concentric outer and inner annular side surfaces 57 and 58, respectively, which ideally form axially aligned, elongate cylindrical surfaces of uniform diameter. However, due to the constraints of manufacturing the projection, the cylindrical side surfaces 57 and 58 normally are slightly inclined relative to the vertical so that these surfaces 57 and 58 thus slightly symmetrically converge toward one another and toward the vertical (e.g. axis 56) as they project axially toward the free end of the upright wall 55. This thus provides the upright wall 55 with a very slight inner and outer taper as defined by the respective inner and other cylindrical side walls 57, 58 to facilitate forming of the projection by dies, and also the separation of the dies after forming of the projection. The slight taper of these side walls is maintained at a minimum small angle, such as about 2° from the perpendicular to the upper sheet surface 53. The free end of the upright wall 55 is defined by an end wall 59 which, in cross section, is of an arcuate convex configuration resembling a semicircle for connection between the generally concentric outer and inner side walls 57 and 58.

The upright wall 55 defines therein a recess 61 which, due to its being bounded by the inner cylindrical side wall 58, is substantially cylindrical in configuration and opens coaxially outwardly through the free end 59 of the projection. This recess 61 is a blind opening in that the inner or lower end thereof is closed off by a base wall or web 62 which extends transversely across the bottom of the recess. This base wall 62 in turn separates the projection-defining recess 61 from a further generally cylindrical recess 63 which opens upwardly into the thickness of the sheet 52 from the bottom surface 54 thereof. Recess 63 is also centered about the axis 56 so as to be substantially coaxially aligned with the recess 61. The recess 63 is defined by a surrounding cylindrical wall 64 which, while preferably extends perpendicularly to the bottom surface 54, is slightly inclined relative to the perpendicular as it extends vertically so as to facilitate manufacture of the projection, e.g. the wall 64 may be inclined about two degrees. The cylindrical wall 64 has an average diameter which is preferably dimensionally similar to (i.e., between about 75% and 125% of) the average diameter Di of the inner cylindrical wall 58 defining the recess 61. The wall or web 62 extends transversely and closes off both the recesses 61, 63 and effects separation thereof. This web 62 is preferably of small thickness in comparison to either the thickness "t" of the sheet 52 or in comparison to the height "h" of the wall 55. Further, the base wall 62 is preferably positioned so that it extends transversely across and closes off the projection recess 61 at a location spaced downwardly a substantial distance from the upper free end 59 thereof and, in the illustrated and preferred embodiment, the web 62 is positioned such that the upper surface 65 thereof is substantially coplanar with the upper surface 53 of the sheet 52 such that the web is recessed downwardly of the apex of the free end 59 a distance "h".

The projection 51, where it joins to the sheet 52, is preferably surrounded by an annular groove or moat 66 which is depressed downwardly into the thickness of the sheet 52 from the upper surface 53 thereof. This surrounding moat or groove 66 preferably has the inner annular boundary wall 67 thereof formed substantially as a downward extension of the outer cylindrical side wall 57, with this boundary wall 67 smoothly merging into a bottom wall of the moat, the latter preferably being of a rounded concave cross section. The moat 66 has a depth which enables it to project downwardly into the thickness of the sheet 52, with the depth of the moat typically being in the range of from 20 percent to 65 percent of the sheet thickness.

Due to the provision of the recess 63 formed on the bottom side of the sheet in coaxial alignment with the projection recess 61, and the additional provision of the moat 66 which exteriorly surrounds the projection 51 and opens downwardly into the sheet from the top surface 53 thereof, there is thus defined an annular wall portion 69 which is part of the sheet 52 and is defined generally radially between the recess 63 and the concentrically surrounding moat 66. This annular wall portion 69 effectively constitutes an axial extension of the annular upright wall 55.

As to the relative sizes or proportions of the projection 51 relative to the sheet 52, the projection preferably has a height "h" as measured perpendicularly between the free end 59 and the upper surface 53, which height "h" is preferably greater than 0.5 times the thickness "t" of the sheet 52. In one embodiment of the projection 51, the height "h" is less than about the thickness "t". The upright wall 55 also preferably has a wall thickness (i.e., one-half the difference between the average outside diameter Do and the average inside diameter Di) which is of similar magnitude to the sheet thickness "t" i.e., the average radial thickness of wall 55 is preferably at least 0.75 times the sheet thickness "t". In an embodiment of the present invention, the average radial thickness of the wall 55 generally equals the sheet thickness "t". Further, the cylindrical projection 51 has a average diameter Dm which is about 2½ to about 5 times the sheet thickness "t", and preferably about 5 times the square root of thickness "t". However, the diameter Dm may be increased to increase the strength of the weld between the sheets by increasing the joined area. Also, the thickness of the base wall or web 62 is typically less than 0.5 times the sheet thickness "t" and more preferably is no more than about 0.25 times the sheet thickness "t". And, in a preferred embodiment, the depths of the recess 63 and moat 66 preferably are such that the bottom or lowermost point of the moat 66 is located substantially at or below a horizontal plane defined by the uppermost point (i.e., the upper closed end) of the bottom recess 63, that is the moat depth generally equals the thickness of the web 62.

Figure 7:
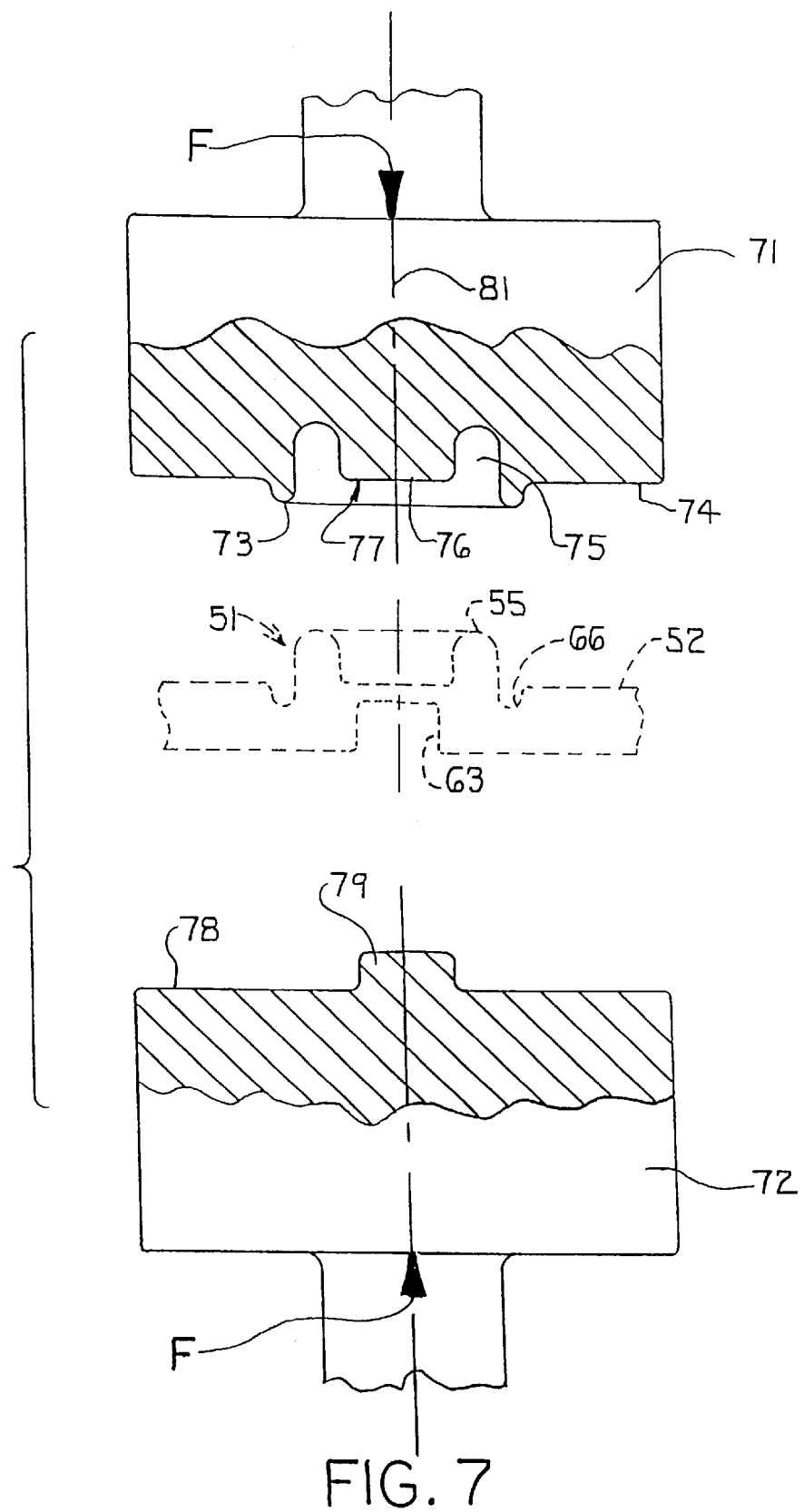
FIG. 7 is a cross sectioned view of a die arrangement for forming the projection.

The projection 51 is formed on the thin sheet 52 by opposed dies which are shaped to effect pressing of the sheet therebetween so as to result in suitable cold working of the sheet to effect forming of the projection. The preferred forming process is known as "coining", and utilizes opposed dies which are simultaneously moveable in a single operation so as to effect pressing and squeezing of the sheet therebetween to effect the desired cold working of the sheet. Exemplary coining dies 71 and 72 are shown in FIG. 7. The dies 71 and 72 are movably positioned on opposite sides of the sheet 52, which sheet is securely held in a suitable holding or clamping structure (not shown), with the opposed dies 71 and 72 then being simultaneously moved inwardly toward one another to engage the sheet therebetween and effect formation of the projection.

The dies 71 and 72 illustrated in FIG. 7 are herein referred to as female and male dies, respectively, inasmuch as the upper die 71 defines thereon the configuration which results in formation of the projection 51, whereas the lower die 72 defines thereon a configuration which results in formation of the bottom recess 63.

More specifically, the female die 71 has an annular rib or dam 73 which projects perpendicularly outwardly from the flat front face 74. The annular dam 73 and its projection outwardly from the face 74 is such so as to result in formation of the moat 66 during the projection forming process. The die 71 also has an endless channel 75 which is disposed radially directly inside the dam 73 and which is recessed perpendicularly inwardly into the depth of the die beyond the front face 74. The channel 75 has a size and configuration which corresponds to and hence results in formation of the upright wall 55 as described above. The channel 75 surrounds a center hub 76 which has an end surface 77 thereof disposed substantially coplanar with the end face 74, which hub 76 thus defines the configuration of cylindrical recess 61 defined within the projection.

The opposed male die 72 defines thereon a flat front face 78 which is disposed in generally parallel relationship to the front face 74 of the female die 71. A forming projection or anvil 79 of generally circular cross section projects perpendicularly outwardly from the face 78 and has a configuration which corresponds to the bottom recess 63 so as to permit formation thereof.

The dies 71 and 72 are disposed in opposed relationship so that the channel 75 and anvil 79 are coaxially aligned along a common axis 81 and are normally spaced a sufficient distance apart so as to permit a sheet 52 to be positioned therebetween and clampingly held. The opposed dies 71 and 72 are then moved inwardly, preferably simultaneously, due to application of driving forces F thereto, the latter being effected by a conventional press mechanism, at a velocity which allows the sheet metal material, preferably aluminum or aluminum alloys to flow. The dies 71 and 72 are simultaneously drivingly moved inwardly so that the annular dam 73 and anvil 79 engage opposite sides of the sheet 52, where further inward driving of the dies causing the dam 73 to penetrate downwardly through the upper surface of the sheet to initiate formation of the moat 66, and at the same time the anvil 79 initiates penetration upwardly through the bottom surface of the sheet so as to permit initiation of the formation of the bottom recess 63. This inward pressing of the dies 71 and 72 toward one another continues until the opposed front faces 74 and 78 are effectively pressingly engaged with the respective upper and lower side faces of the sheet. When reaching this position the material of the sheet 52 has been suitably cold worked, e.g. coined, so as to effect formation of the projection 51 substantially as illustrated in FIG. 6.

During the forming of the projection as briefly summarized above, the opposed ends of the anvil 79 and hub 76 cooperate to effectively squeeze (i.e., cold work) the aluminum sheet material radially outwardly into the annular void defined by the channel 75 and, at the same time, the penetration of the annular rib 73 into the upper surface of the sheet material and the resulting moat 66 defined thereby effectively assists in causing the cold flowing material which is squeezed radially outwardly between the opposed center hubs 76 and 79 to be deflected axially upwardly so as to flow into and effectively fill the channel 75 so as to permit formation of the upright wall 55. During this coining of the projection, the cold working of the aluminum sheet material effects significant flow of the material sidewardly relative to the force direction inasmuch the material which originally occupies the bottom recess 63 is forced sidewardly and thence axially so as to ultimately fill the channel 75. The formation of the projection 51 by this coining operation, and the significant cold working of the material during the coining operation, thus enables a significantly greater quantity of material to be utilized for forming the upright wall 55 so that the wall can have desired height and thickness properties, and also enables the wall to be substantially perpendicular to the base sheet material to thus provide optimum strength properties. This cold working of the material also significantly increases the strength and hardness of the resulting projection, thereby providing more desirable properties with respect to its successful utilization for projection welding.

Further, due to the shape of the projection 51 and the forming process associated therewith as summarized above, the annular upright wall 55 defining the projection 51 effectively extends downwardly to the bottom surface 54 of the sheet since the annular wall portion 69 is substantially coaxially aligned with and hence effectively constitutes an extension of the upright wall 55, thereby maximizing the upright column strength of the projection relative to the base sheet material. This annular wall part 69 and its disposition directly under the upright column thus provides reinforcement for the column and prevents undesirable premature collapse thereof during projection welding.

In one exemplary embodiment of the invention, the projection 50 is formed on a thin aluminum sheet 52 having a thickness in the range of about 0.030 to 0.035 inch. The height of the projection wall 55, and the depth of the female die channel 75 into which the metal flows to create the wall, equals about 0.028 inch. The diameter of the cylinder defined by the center of projection wall 55, i.e. Dm, is about 0.15 inch. The width of the base of the wall roughly equals the thickness of the sheet 52, and thus is in the range of about 0.030 to 0.035 inch. The moat 66 has a depth of about 0.20 inch.

The projection 51 as described above is preferably utilized in conjunction with a low-inertia fast-response welding gun, one example of which is illustrated in U.S. Pat. No. 5,714,730 owned by Newcor, Inc., one of the Assignees hereof. More specifically, the welding gun for use with the projection 51 incorporates therein additional features which are disclosed in copending U.S. Ser. No. 08/895 526, now U.S. Pat. No. 6,054,668 also owned by Newcor, and the disclosure of which is herein incorporated by reference. To further improve on the welding gun for effecting projection welding of aluminum sheets employing the improved projection 51 described above, specifically to further reduce the mass and inertia of the welding gun and further improve the fast follow-up response of the gun during collapse of the projection, the construction and operation of the welding gun has been further improved to incorporate additional modifications which are described below with reference to FIGS. 8–10.

Figure 8:
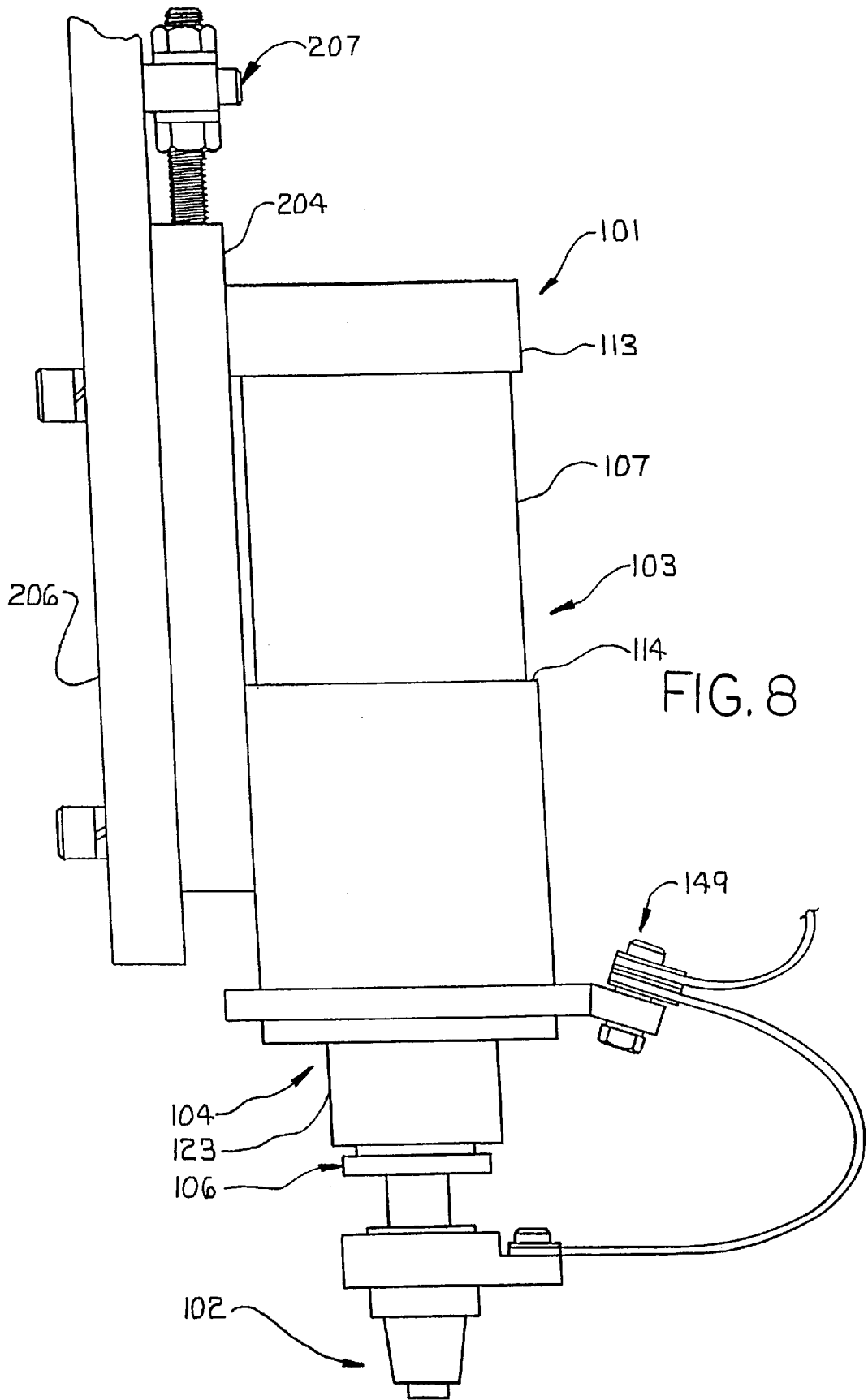
FIG. 8 is an elevational view of an improved welding gun.
Figure 9:
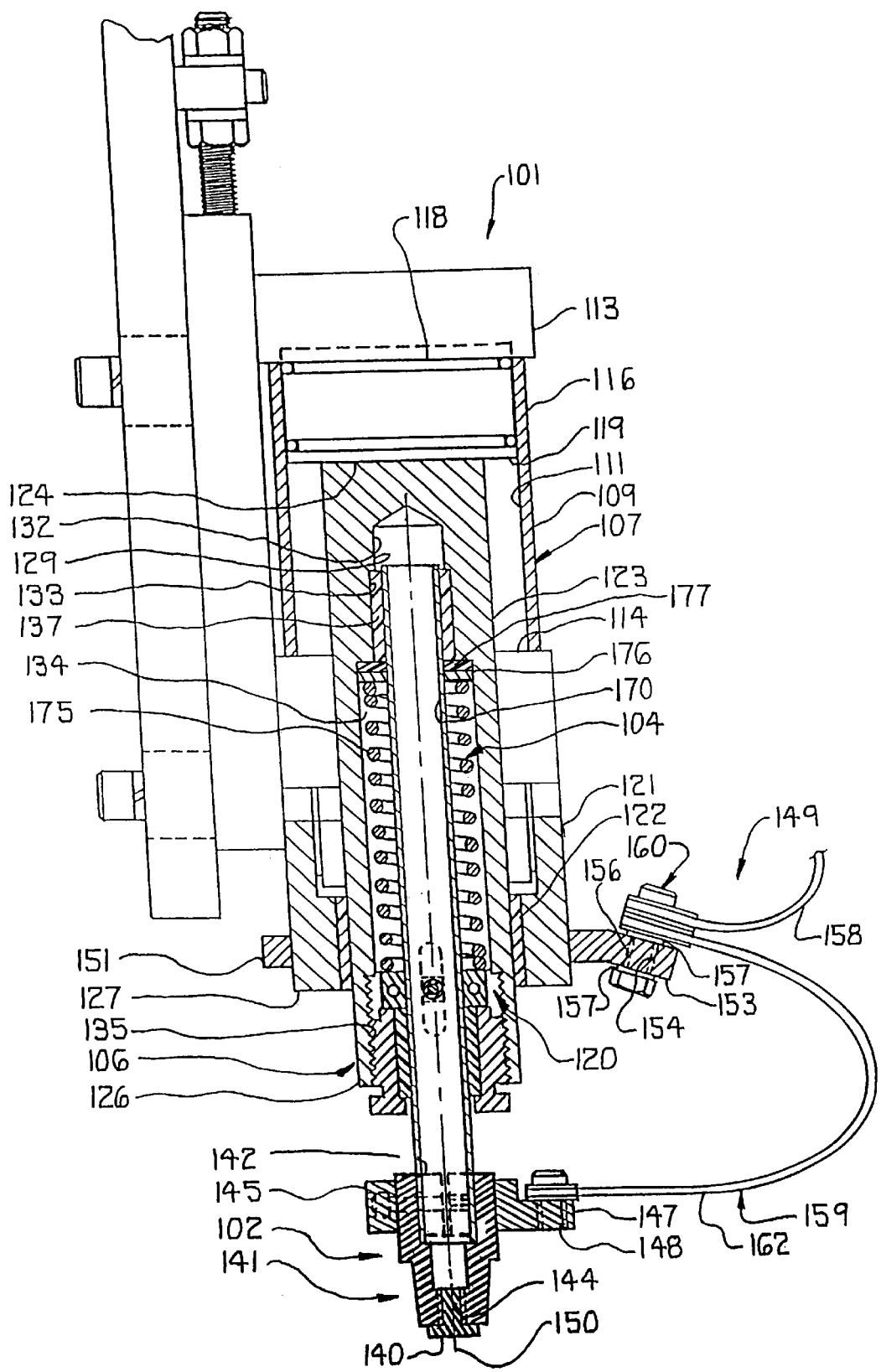
FIG. 9 is a longitudinal cross sectional view of the gun of FIG. 8.
Figure 10:
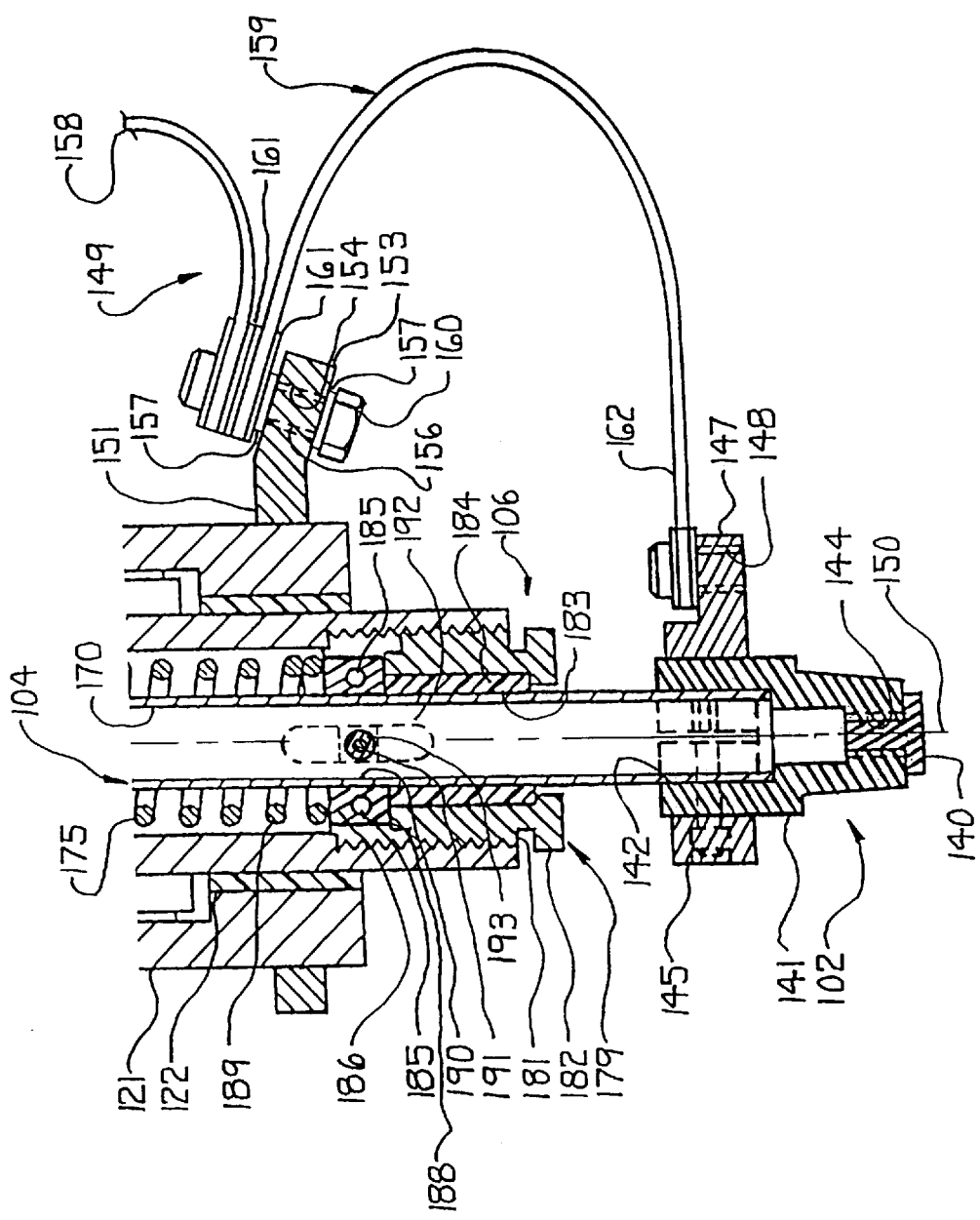
FIG. 10 is an enlarge partial cross-sectional view of a part of FIG. 9.

Referring to FIGS. 8–10, there is illustrated an improved integral projection welding head and drive assembly 101 according to the present invention, which integrated assembly 101 replaces the drive device 36 and head assembly 17 of the conventional system shown in FIG. 1. This assembly 101, which includes an electrode assembly 102 mounted on a fluid pressure drive cylinder 103, is particularly desirable for creation of a projection weld between overlapping thin metal sheets, such as illustrated in FIG. 1, and in particular for creation of a projection weld involving the inventive aluminum projection 51 discussed above. The assembly 101 is also particularly suitable for application of a short-duration unipolar current pulse or a plurality of reduced amplitude current pulses each having a duration less than one half cycle of an alternating current wave form, and for preloading the electrode spring force as described in the aforementioned '730 patent. The assembly 101 further includes a low-interia, fast-response force generating unit 104 providing an outward biasing force to the electrode assembly 102, and an adjusting structure 106 for selecting the force generated by the force generating unit 104.

Specifically, the drive cylinder 103 has an elongate housing 107 including an elongate cylinder wall 109 surrounding a bore 111. The bore 111 is respectively closed at its upper and lower ends by upper and lower heads 113, 114. As a result, the bore 111 defines a fluid driven chamber in which a piston 116 is reciprocally driven downward and upward effecting movement of the electrode assembly 102. More specifically, the piston 116 is slidably received in the bore 111 and fluidly divides the bore into a forward pressure chamber 118 and a return pressure chamber 119. At least two ports (not shown) respectively communicate fluid to the pressure chambers 118, 119 to effect movement of the piston 116. A bearing housing or carrier 121 is fixed at one end of the drive cylinder 103 adjacent the lower head 114, has a cylindrical bushing 122 fixed therein, and defines a lower free end 127 remote from the head 114.

A cylindrical rod 123 is securely cantilevered to the piston 116 at a fixed end 124 and extends through the return pressure chamber 119, lower head 114, bearing carrier 121, and is slidably supported in bushing 122 so that a lower free end 126 of the rod 123 extends axially beyond the bearing carrier lower end 127. The rod 123 includes a blind bore 129 opening from the rod free end 126 and extending axially along the longitudinal central axis 150 substantially the length of the rod 123 and ending adjacent at the fixed rod end 124. The bore 129 of rod 123 has a stepped configuration wherein a first bore portion 132 is positioned closest the fixed rod end 124 and has a closed upper end. Second, third and fourth bore portions 133, 134, 135 are sequentially arranged from the first bore portion 132 to the free rod end 126. The diameters of the bore portions 132, 133, 134, 135 respectively increase. The second bore portion 133 receives a cylindrical bearing or bushing 137 therein. The fourth bore portion 135 is internally threaded.

The electrode assembly 102 is spaced from the drive cylinder 103 and includes a generally tubular electrically conducting adapter block 141 having a coaxial mounting opening 142 and electrode-receiving opening 144 at opposite ends thereof. The mounting opening 142 has a diameter greater than the diameter of the electrode receiving opening 142. The adapter block 141 at the mounting opening end is diameterally cut so that the mounting opening 142 of the block closes when a reduced height split clamp 145 is tightened thereon. A portion of the split clamp 145 encircles the block 141 and has only a sufficient height to receive a screw therein perpendicular to the splits in the clamp and the block so that the screw can tighten the clamp onto the block while partially closing the mounting opening 142. The clamp 145 includes a reduced height flange 147 which projects sidewardly (i.e., radially) relative to the axis or movement direction 150, and has a thread aperture 148 extending vertically there through parallel to the axis 50. The clamp 145 is configured to provide a minimal mass. The electrode receiving opening 144 receives a bolt-like electrode 140 therein. The electrode 140 may, as illustrated, include a threaded elongate stem and an enlarged lower workpiece-contact end that is integral with one end of the stem and contactingly adjacent the adapter block 141 when the electrode is fully threaded into the adapter block.

An electrical power supply assembly 149 supplies electrical current to the electrode assembly 102 and is secured to a lower portion of the housing 107 adjacent a lower end thereof. The power supply assembly 149 includes a holder or clamp ring 151 received over and fixed to the carrier 121, for example by set screws (not shown). A radially extended flange 153 of the holder 151 is declined about 20 degrees with respect to the remainder of the holder 151 and includes at least one, and preferably two, bolt receiving apertures 154 extending perpendicularly therethrough. An electrical conductor 158, typically a laminated flexible conductive shunt defined by a plurality of superimposed thin copper plates, is electrically connected at one end to an electrical power supply, for example the transformer 22, control 23 and voltage source shown in FIG. 1, and at the other end to one end of a flexible electrical conductor 159, with these adjacent ends being secured to the flange 153. The conductor 159 is a plurality of elongate electrically conductive flexible plates, e.g. superimposed thin copper plates, fixed together at each end by metal caps or clips 161, e.g. silver plated copper C-shaped clips. The conductors 158, 159 each have an aperture therethrough adjacent the ends thereof through which a bolt 160 extends to secure the conductor and lamination together onto the flange 153. Insulative sleeves 156 are respectively positioned in the apertures 154 and insulative washers 157 are positioned on respective upper and lower faces of the holder portion 153 so as to electrically insulate the holder 151, and hence the carrier 121 and housing 107, from the electrical conductors 158, 159. The other end of conductor 159 is secured, eg. bolted, to the flange 147 of the clamp 145 to transmit electrical energy therethrough to the adapter block 141 and electrode 148. The conductor 159 extends a short distance from the flange 153 to the clamp 145 in a generally C-shape with its lower leg 162 extending essentially perpendicular to the axis 150 in the fully extended position of the electrode assembly 102 as shown in FIGS. 9 and 10.

The bore 139 of the rod 123 slidably receives an elongate hollow rigid tube 170 centered about the central axis 150 and which is preferably a cylindrical tube made of a chromolly. The bushing 137 slidably journals the upper part of the tube 170 therein. The tube 170 has an outer diameter at least slightly less than the diameter of the first bore portion 132 so that it is readily receivable therein. The smooth-walled tube 170 is partially housed within the fourth bore portion 135 and extends axially outwardly beyond the bore 129 and the free rod end 126. The electrode assembly 102 is fixedly mounted at a lower longitudinal end of the hollow tube 170 and is spaced from the rod 123. The lower end of the tube 170 is received in the mounting opening 142. The clamp 145 is tightened on the split portion of the adapter block 141 which fixes the clamp 143 and the block 141 onto the free end of the tube 170.

The force generation unit 104 includes an axially elongate spring 175, preferably a coil spring, that is entirely housed in the bore 129, and entirely in the third bore portion 134 in the illustrated embodiment. The spring 175 has a diameter less than the diameter of the third bore portion 134 and greater than the outer diameter of the tube 170 so that the spring 175 is free from frictional interference and is electrically insulated from the rod 123 or tube 170. A ring-like bearing washer 176 is mounted on an electrically insulative washer 177 which is mounted on the step face between the second and third bore portions 133, 134. The washers 176 supportingly receives an upper end of the spring 175 thereagainst on the axially downwardly facing side thereof. Thus, the bearing washer 176 acts as a support surface for the spring 175 and the insulative washer 177 supports the bearing washer 176. On the axially upward facing side of the washer 177, an end of the cylindrical bushing 137 rests thereon to assist the holding of the bushing 137 in the second bore portion 133.

The adjusting structure 106 includes a stop or end assembly 179 that is positioned at the free rod end 126 and includes a generally cylindrical fitting 181 that is externally threaded and is threadedly received in the fourth bore portion 135. The fitting 181 has radially outwardly extending drive flanges 182 at a lower end thereof. The drive flanges 182 are axially spaced from the free rod end 126 so that the drive flanges are engageable by a suitable means, ie. a tool or manually, to rotate the end assembly 179 relative to the fourth bore portion 135 thereby axially positioning the end assembly in the fourth bore portion. The fitting 181 also has a cylindrical longitudinal through opening 183 extending centered about the longitudinal central axis 150. The opening 183 receives an electrically insulative, cylindrical bushing 184 fixed therein that slidably supports the lower part of the tube 170. The upper face of the bushing 184 may not axially extend above the upper face of the fitting 181. A lightweight, e.g. aluminum, split stop ring or collar 186 is positioned above the upper end of the adjustment fitting 181 in either the third or fourth bore portion 134, 135 intermediate the ends of the tube 170. The collar 186 has apertures 185 in each half receiving connecting screws joining the halves together and has a greater radial wall width than the cylindrical bushing 184 so that it extends radially outwardly relative to the bushing. The collar 186 extends radially outwardly so that a lower face 188 thereof contacts the upper end of the fitting 181 stopping the collar 186 in its lowermost axial position. An upper face 189 of the annular collar 186 abuts a lower end of the spring 175, thus defining a second support surface for the spring with the spring 175 forcing the collar 186 downwardly onto the fitting 181.

An anti-rotation mechanism 190 is positioned intermediate the ends of the tube 170 within the third or fourth bore portions 134, 135 and includes, an electrically insulative sleeve 193 fixed in the tube 170, a pin 191 extending radially from the tube 170 and pressed into the sleeve 193, and an elongate slot 192 extending longitudinally in the rod 123. The slot 192 receives the pin 191 therein after the pin passes through a radial bore in the collar 186. The slot 192 has a width substantially equal to the diameter of pin 191 to prevent relative rotational movement between the central tube 170 and rod 123. The slot 192 has a height significantly greater than the diameter of the pin 191 for allowing relative axial movement of the tube 170 with respect to the rod 123.

The assembly 101 is secured to an attachment plate 204 that is secured to a fixed support 206 and axially slidable on the support 206 (FIG. 9). A conventional position selection mechanism 207 fixes the attachment plate 204 to the support 206 preventing movement therebetween once the assembly is positioned for repeatable welding operations.

The operation of the integral welding head and drive cylinder assembly 101 of the present invention will now be described in conjunction with the projection 51.

It is desirable to precisely control and predetermine the force applied onto the projection 51 by the electrode assembly 102 during a projection welding operation by providing a fast response of the welding assembly 101 onto the projection 51 during the welding operation. The present invention provides for the precompression of the spring 175, which is entirely housed in the rod 123 and biases a reduced mass and inertia tube 170 and electrode assembly 102, so that repeatable and uniform projection welds are created by the inventive projection welding assembly 101.

When the electrode assembly 102 is fully assembled and in its fully extended state as shown in FIG. 10, the electrode assembly is linearly extended from the rod 123 by its greatest extent and the conductor shunt 159 is in an C-shape. In the electrode assembly's fully extended state, the spring 175 is confined and precompressed between axially spaced support surfaces, namely the bearing plate 176 and collar 186, to create the preload force. More specifically, one end of spring 175 is fixed relative to the rod 123 by the bearing plate 176. The other end of the spring 175 is confined by the collar 186, which collar is axially moveable relative to the rod 123 and bearing plate 176. The axial positioning of the first support surface, collar 186, relative to the second spring support surface, bearing plate 176, is set by the position of the end assembly 179 in the fourth bore portion 135. The end assembly 179 is shifted in its axial position in the fourth bore portion 135 by threading the fitting 181 in the fourth bore portion to axially position the upper surface of fitting 181 on which the spring 175 pushes the collar 186. This positioning of the fitting 181 and, hence, the collar resting thereon, adjustably confines the spring 175 between the first and second support surfaces thereby preloading the spring at a predetermined preload force.

The preload force maintains the electrode assembly 102 and tube 170 in their fully extended position until a force is applied oppositely directed to the preload force overcoming the same so as to displace the electrode assembly 102 and tube 170 upwardly respective to the rod 123 and axially into the bore 129 against spring 175. When the electrode assembly 102 is displace upwardly along the axis 150, the lower leg 162 of the conductor 159 moves closer to the upper leg of the conductor 157.

To achieve a welding operation, a welding stroke begins in the position shown in FIGS. 8 and 9. More specifically, the rod 123 is retracted into the drive cylinder 107 and the electrode assembly 102 is fully extended from the rod 123. The rod 123 drives the electrode assembly 102 into contact with a workpiece after the rod travels a first distance which is less than the entire piston and rod travel distance. The rod 123 continues to travel a further short distance while the electrode assembly 102 and tube 170 are spatially fixed due to the electrode contacting the workpiece in alignment with the projection 51 so as to compress the spring 175 by the same short distance, i.e., the washer 176 moves closer to collar 186. The further compressed spring 175 produces a second spring force, which force biases the electrode assembly 102 in a downwardly direction toward the workpiece and provides the force to the interface of the projection 51 and the adjacent sheet in contact therewith. Due to the further spring compression, the second force is greater than the first spring force, and in a preferred embodiment, the second spring force is reduced to about 200 lbs. which differs from conventional forces applied to projections during conventional projection welding operations which can be about 400 lbs. It is desirable to reduce the force applied to an aluminum projection so that the current applied to the projection can likewise be reduced. It is also desirable to preload the spring 175 to such an extent to prevent wide variations in spring force initially transmitted to the electrode assembly 102 in its fully extended position so as to avoid damage to the workpieces and achieve a repeatable consistent projection weld.

After the electrode 140 contacts a workpiece and the rod 123 continues to travel downwardly during the welding stroke, the fitting 181, which is fixed to the rod 123, slides downwardly with the bushing 184 sliding on the tube 170 away from the collar 186. The third bore portion 134 has a diameter at least slightly greater than the outer diameter of the collar 186 so that the third bore portion can move downwardly noncontactingly around the collar. The separation distance between the fitting 181 and collar 186 is equal to the maximum distance that the electrode can travel to follow the collapse of the projection 51, specifically the projection wall 55, into a weld nugget or joint fixing the two sheets together. It is desirable that the force created by the spring 175 acting on the collapsing projection be reduced so that less distortion, or read-through of the sheets is created and a lower welding current can be used to heat the projection.

Once the rod 123 reaches its downwardmost point and the spring 175 is fully compressed, an electrical current welding pulse is applied to the shunt 158 and travels through conductor 159 to the electrode assembly 102. The current pulse preferably has a duration less than or equal to one-half wave cycle of an alternating current applied to the welding system. If necessary, additional pulses can be applied to sufficiently heat the projection 51 to cause its collapse. When the current pulse travels through the conductor 159, it creates a force on the conductor 159 which tends to effect straightening of the conductor and thus tends to force the legs of the C-shaped conductor 159 to move away from one another. Since the upper conductor leg is fixed to the flange 153 and hence the stationary housing 107, the straightening force thus acts on the lower conductor leg 162 as fixed to the electrode assembly 102, which is in a nonfully extended position, and thus urges leg 162 and electrode assembly downwardly toward the workpieces. Consequently, the conductor 159 assists the spring 175 to provide a fast response follow up to the collapse of the projection 51.

The welding gun assembly 101 thus provides an improved, repeatable follow up to the collapse of the projection 51 during a projection welding operation. More specifically, the moving follow up structure includes the electrode assembly 102, electrical conductor 159, and tube 170, all of which contribute to the improved follow up as the projection 51 collapses. The mass of the electrode assembly 102 is reduced by a smaller electrode 140 being threadedly received in the adaptor block 141 which also has a reduced mass and a reduced thickness clamp 145 securing the adaptor block 141 to the tube 170. The conductor 159 has a C-shape with one leg being fixed on the housing bearing 122, and spacially fixed during a welding operation, and the other leg 162 being fixed to the flange 147 of the clamp 145 transverse the axis 150 of the welding gun assembly 101 for movement with the electrode assembly 102. The conductor 159 has a tendency to straighten when a welding current pulse is applied thereto. Thus, another advantage is the positioning of the conductor 159, which uses this tendency to supplement the spring 175 forcing the electrode assembly's follow up of the projection 51 collapse. A further advantage is the ends of the conductor 159 being in close proximity to each other so as to minimize the mass of the conductor 159. Another advantage is the reduced mass of the hollow tube 170 which the spring 175 acts through to drive the electrode assembly 102 downwardly following the collapse of the projection 51. The welding gun assembly 101 thus provides an improved follow up to the projection 51 collapse.

In one embodiment of the invention, the sheet including the projection thereon is an aluminum sheet, whereas the adjacent other metal body may be a steel sheet. The projection is coined onto the aluminum sheet using the process described herein. The projection is brought into contact with the steel sheet and welded according to the process and equipment described herein. Recent testing indicates that a sufficient metallurgical securement between the aluminum and steel sheets can be created.

It is within the scope of this invention to coin nonhollow projections on aluminum sheets, for example elongate ribs, which are surrounded by the moat. These projections are columnar and are not pointed, i.e. they are rounded, at the apex thereof.

The projection described above and shown in the drawings has an annular and right cylindrical shape. It is within the scope of this invention to have other shapes such as nonright cylindrical, elliptical, etc.

While the above described embodiment of the welding system discloses a transformer and controller for supplying the current pulse, it will be understood that any device capable of providing a welding current pulse is within the scope of this invention. Other conventional types of such devices includes capacitor discharge and medium frequency devices.

Although a particular preferred embodiment of the invention has been disclosed in detail for illustrative purposes, it will be recognized that variations or modifications of the disclosed construction and apparatus, including the rearrangement of parts, lie within the scope of the present invention.

The invention claimed is:

1. A process for welding a projection in a first thin aluminum sheet to an adjacent second metal body, comprising the steps of:

providing a first thin metal sheet of aluminum or aluminum alloy;

positioning the first sheet between first and second coining dies configured to form a projection in the first sheet;

contacting the first and second coining dies respectively with opposed first and second side surfaces of the first sheet;

squeezing the first sheet between the first and second coining dies to cause the metal of the first sheet to cold flow radially and axially into a channel in the first coining die so as to create a projection configured as an upright annular wall which extends transversely outwardly from the first surface and which defines a hollow interior therein with said upright annular wall being backed by an annular portion of said first sheet which extends generally between said first and second surfaces and effectively constitutes an axial extension of the upright annular wall;

providing a welding head assembly which reciprocally supports an electrode having a tip which is disposed in generally opposed relation to a support;

positioning said first sheet and said second metal body adjacent one another and generally between the tip of the electrode and said support so that a tip of the projection on said first sheet contacts an opposed surface on the second metal body with the projection being substantially aligned with the electrode;

engaging the tip of the electrode with an exterior surface of one of the first sheet and second metal body and substantially in alignment with the projection, and applying a pressing force from said electrode onto said exterior surface for holding said first sheet and said second metal body in overlapping relation between said electrode and said support;

applying a welding current pulse to said electrode for transmission into said first sheet and said second metal body where they contact at said projection to effect heating of said projection; and continually pressing said electrode against said exterior surface throughout heating thereof by said welding current pulse so that the electrode follows up and assists in the collapse of the projection so as to create a weld nugget between said first sheet and said second metal body and to effect pressing together of said first sheet and said second metal body at said weld nugget.

2. A process according to claim 1, wherein the squeezing step includes cold flowing metal inwardly from the second surface of the sheet to create a recess which opens inwardly from the second surface substantially in alignment with but separated from the hollow interior defined within the upright annular wall.

3. A process according to claim 2, wherein the step of cold flowing includes preventing the metal squeezed from the recess in the second surface from flowing laterally into the remainder of the sheet.

4. A process according to claim 3, wherein the step of preventing the material squeezed from the recess in the second surface from flowing laterally into the remainder of the sheet includes cold flowing metal from the first surface of the sheet to create an annular recess which opens inwardly from said first surface and which is disposed in closely adjacent and surrounding relationship to the upright annular wall.

5. A process according to claim 4, wherein the squeezing of the sheet to cold flow metal to form the upright annular wall also includes preventing the cold flowing metal from flowing into the hollow interior of the upright annular wall so as to create an interior recess which ends at a bottom wall disposed substantially at said first surface.

6. A process according to claim 1, wherein the squeezing of the sheet includes cold flowing metal from the first surface of the sheet in closely adjacent and surrounding relationship to the upright annular wall to create an annular recess which opens inwardly from said first surface and which projects only partway into the thickness of said sheet.

7. A process according to claim 6, wherein the squeezing step includes cold flowing metal from the second surface of the sheet to create a recess which opens inwardly from the second surface generally in alignment with the hollow interior of said upright annular wall but separated therefrom by a bottom wall having a thickness less than the thickness of said sheet, the squeezing causing the cold flowing of metal radially and axially into the channel in the first die so as to create said upright annular wall.

8. A process according to claim 1, wherein the welding head assembly includes a spring arrangement which exerts a continuous biasing force against the electrode when the tip thereof is engaged with said exterior surface so that the electrode is continuously urged toward the projection so as to apply pressure thereto and follow up the collapsing movement of the projection while maintaining engagement of the electrode tip with said exterior surface, and said welding head assembly including a generally U-shaped laminated electrically conductive strap having one leg joined to the electrode head and extending generally transverse to the electrode movement direction so that the strap when electrically energized exerts a biasing force on the electrode which urges it toward the projection to assist in rapid follow-up movement of the electrode during collapse of the projection.

* * * * *